Nov. 16, 1926.
B. McCORMICK
1,607,011
DYNAMO ELECTRIC MACHINE
Filed July 16, 1925
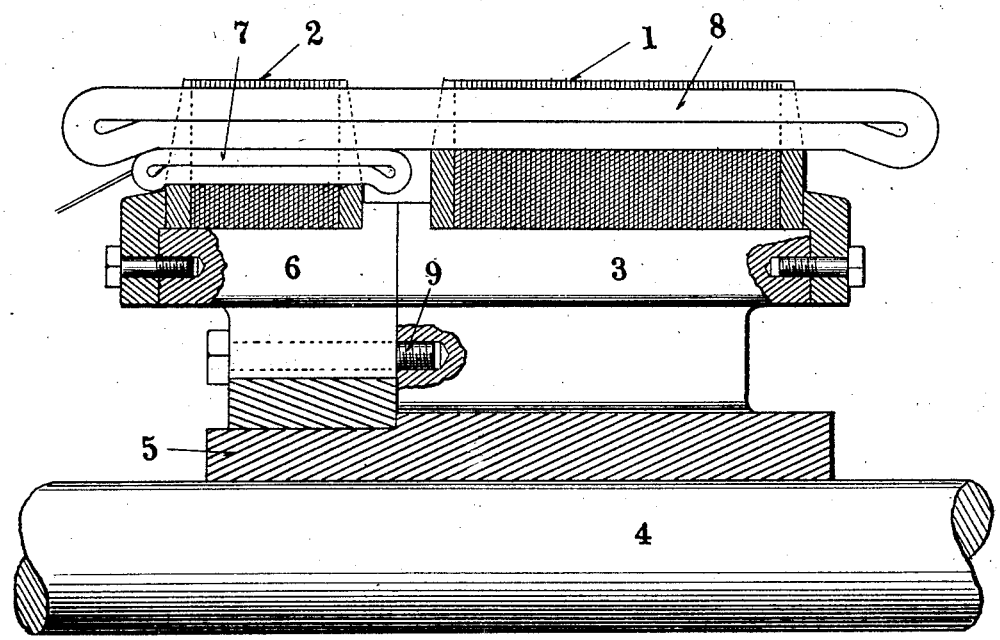
INVENTOR
Bradley McCormick
BY
ATTORNEY Patented Nov. 16, 1926.

1,607,011

UNITED STATES PATENT OFFICE.

BRADLEY McCORMICK, OF ST. LOUIS, MISSOURI, ASSIGNOR TO WAGNER ELECTRIC CORPORATION, OF ST. LOUIS, MISSOURI, A CORPORATION OF DELAWARE.

DYNAMO-ELECTRIC MACHINE.

Application filed July 16, 1925. Serial No. 43,909.

My invention relates to the structure and method of manufacture of the rotor or stator member of dynamo electric machines of the type in which magnetic structure of one of these members comprising two portions, one of which is provided with a winding which does not embrace the other. In such machines it is of course desirable that the parts of the magnetic structure be separated by as small a space as possible and if this space is no larger than necessary to accommodate the end turns of the coils which embrace only one of the parts, it will be too small for the satisfactory application and insulation of the winding if both parts of the laminated structure are mounted on a single support before the windings are applied.

My invention hereinafter described enables the type of machine referred to to be wound and insulated as satisfactorily as those in which all windings embrace the entire magnetic structure of a member of the machine.

In the accompanying drawing, which illustrates the rotor member of a dynamo electric machine constructed in accordance with my invention, the laminated magnetic structure is in two parts 1 and 2, part 1 being mounted on a spider 3 carried by the shaft 4. This spider is provided with a lateral annular projection 5. The part 2 of the laminated magnetic structure is mounted on a separate spider 6 provided with an opening to receive the lateral projection 5 of the spider 3, which projection forms the support for the spider 6.

In the particular machine illustrated, winding 7, which would ordinarily be a commutated winding, embraces the part 2 only of the magnetic structure, and the winding 8, which would ordinarily be an alternating current winding, embraces both the parts 1 and 2 of the magnetic structure. The spider 6 is secured against rotation relative to the spider 3 by means of bolts 9.

By constructing the rotor in the manner described, I am enabled to mount the laminæ of the part 2 on the spider 6, and to apply the winding 7 thereto before the spider 6 is brought into assembled relation with spider 3, and can therefore satisfactorily apply this winding and insulate its end turns, and consequently the space between the parts 1 and 2 of the magnetic structure may be made only great enough to accommodate the end turns of winding 7. After the winding 7 is applied to the laminæ mounted on spider 6 it is brought into assembled relation with the spider 3, and the winding 8 is then applied to both parts.

Having fully described my invention, what I claim as new and desire to secure by Letters Patent of the United States is:

1. In a dynamo electric machine, the combination of a magnetic structure, a support therefor having a laterally projecting portion, a second magnetic structure laterally adjacent to the first, a support for said second structure mounted on the lateral projection of the first named support, and means securing said supports against relative rotation.

2. In a dynamo electric machine, the combination of a magnetic structure, a support therefor having a laterally projecting portion, a second magnetic structure laterally adjacent to the first, a support for said second structure mounted on the lateral projection of the first named support, means securing said supports against relative rotation, a winding embracing one magnetic structure only and having its end turns at one side located between the two magnetic structures, and a second winding embracing both magnetic structures and lying above the first mentioned winding.

In testimony whereof, I have hereunto set my hand this the 3d day of July, 1925.

BRADLEY McCORMICK.